United States Patent [19]

Kinoshita

[11] Patent Number: 5,210,621
[45] Date of Patent: May 11, 1993

[54] FACSIMILE APPARATUS

[75] Inventor: Haruki Kinoshita, Tokyo, Japan

[73] Assignee: Kabushiki Kaisha Toshiba, Kawasaki, Japan

[21] Appl. No.: 584,129

[22] Filed: Sep. 18, 1990

[30] Foreign Application Priority Data

Sep. 22, 1989 [JP] Japan ................................ 1-246888

[51] Int. Cl.$^5$ ............................................. H04N 1/00
[52] U.S. Cl. .................................. 358/440; 358/434; 379/100
[58] Field of Search ............... 358/440, 400, 401, 404, 358/434, 435, 436, 437, 438, 439, 442; 379/100, 127

[56] References Cited

U.S. PATENT DOCUMENTS

| | | | |
|---|---|---|---|
| 4,607,289 | 8/1986 | Kurokawa | 379/100 |
| 4,654,718 | 3/1987 | Sueyoshi | 358/440 |
| 4,847,891 | 7/1989 | Kotani | 358/440 |
| 4,920,560 | 4/1990 | Kageyama | 358/440 |
| 4,922,524 | 5/1990 | Baba et al. | 358/440 |
| 4,926,463 | 5/1990 | Ukegawa | 379/100 |
| 4,956,860 | 9/1990 | Murata | 358/440 |
| 4,996,704 | 2/1991 | Brunson | 379/100 |

FOREIGN PATENT DOCUMENTS

| | | | |
|---|---|---|---|
| 1-268237 | 10/1989 | Japan | 358/442 |
| 2-65543 | 3/1990 | Japan | 358/407 |

Primary Examiner—Edward L. Coles, Sr.
Assistant Examiner—Thomas D. Lee
Attorney, Agent, or Firm—Finnegan, Henderson, Farabow, Garrett & Dunner

[57] ABSTRACT

A facsimile apparatus of the type which is connected to a digital line and which has the function of automatically informing a particular destination terminal of the reception of a facsimile signal from a distant terminal. In the apparatus, identification information on a particular facsimile apparatus and a telephone number of a destination terminal are previously stored in a memory unit. During the reception of a facsimile signal, the apparatus detects an identification information of a distant terminal which is transmitted therefrom over a digital line. If it is determined that the detected identification information corresponds to the identification information stored in the memory unit, the facsimile apparatus automatically originates a call on the basis of the telephone number of the destination terminal which is stored in the memory unit and sends to the destination terminal a message stating that a facsimile signal has been received from the particular facsimile apparatus. In another form of facsimile apparatus, a telephone number of a destination terminal is previously stored in the memory unit. This form of facsimile apparatus is arranged to automatically originates, if a facsimile signal is received over a first channel of the digital line, a call on the basis of the telephone number stored in the memory unit and sends a message stating that a facsimile signal has been received to the destination terminal over a second channel of the digital line.

10 Claims, 9 Drawing Sheets

| ID | DESTINATION TELEPHONE NUMBER |
|---|---|
| ID1 | |
| ID3 | |
| ID4 | TEL1 |
| ⋮ | |

FIG. 3

| ID | DESTINATION TELEPHONE NUMBER |
|---|---|
| ID1 | TEL1 |
| ID2 | |
| ⋮ | |
| IDK | TELK |
| IDK+1 | |
| ⋮ | |
| ⋮ | ⋮ |

FIG.4

| ID | DESTINATION TELEPHONE NUMBER |
|---|---|
| ID1 | TEL1 |
| ID2 | TEL2 |
| ID3 | TEL3 |
| ⋮ | ⋮ |

FIG. 5

FACSIMILE APPARATUS

BACKGROUND OF THE INVENTION

1. Field of the Invention

The present invention relates generally to facsimile apparatus of the type which are connected to digital lines and, more particularly, to a facsimile apparatus provided with a function of automatically informing a particular destination terminal that a facsimile signal has been received from a distant terminal.

2. Description of the Related Art

In the field of a facsimile apparatus of the type which is connected to an integrated services digital network (hereinafter referred to as "ISDN")—one of digital networks which have rapidly been gaining in popularity, it has been proposed to provide various kinds of incoming controls utilizing services peculiar to ISDN.

One typical example is a process of detecting, during the reception of an incoming facsimile signal, a subscriber's number transmitted from a distant terminal over the ISDN and indicating the detected subscriber's number on a display of a facsimile apparatus situated on a receiving side, thereby informing an operator which distant terminal has transmitted the incoming facsimile signal.

However, such a control executed on the receiving side has a problem that, if the operator on the receiving side is to determine which distant terminal has transmitted the incoming facsimile signal, he or she must be positioned near or move to a place where the facsimile apparatus is located and look at the display.

As described above, such a conventional facsimile apparatus utilizes the method of informing an operator of the reception of a facsimile signal from a distant terminal merely by providing a display of the subscriber's number of the distant terminal which is transmitted therefrom over an ISDN line. As a result, the operator must move to a place where the facsimile apparatus on the receiving side is located in order to correctly determine which distant terminal has transmitted the incoming facsimile signal.

SUMMARY OF THE INVENTION

It is therefore an object of the present invention to provide a facsimile apparatus which enables an operator to correctly determine which distant facsimile apparatus has transmitted a facsimile signal without the need to move to and look at a display of the facsimile apparatus situated on the receiving side.

It is another object of the present invention to provide a facsimile apparatus which is capable of informing an operator of the reception of a facsimile signal from a distant facsimile apparatus by utilizing a non-busy channel.

To achieve the above described objects, according to the present invention, there is provided a facsimile apparatus which is arranged in such a manner that identification information indicative of a particular facsimile apparatus and a telephone number assigned to a destination terminal are previously stored in a memory unit. During the reception of an incoming facsimile signal, the facsimile apparatus detects an identification information of a distant terminal which has been transmitted therefrom over a digital line. If it is determined that the detected identification information of the distant terminal corresponds to the identification information stored in the memory unit, the facsimile apparatus automatically originates a call on the basis of the telephone number of the destination terminal which is stored in the memory unit and sends to the destination terminal a message stating that a facsimile signal has been received from the particular facsimile apparatus.

According to another aspect of the present invention, there is provided a facsimile apparatus which is arranged in such a manner that a telephone number of a destination terminal to be informed of the reception of an incoming facsimile signal is previously stored in a memory unit. If a facsimile signal is received over a first channel of a digital line, the facsimile apparatus automatically originates a call on the basis of the telephone number of the destination terminal which is stored in the memory unit and sends a message stating that a facsimile signal has been received to the destination terminal over a second channel of the digital line.

For example, a particular distant facsimile apparatus which is expected to transmit a facsimile signal and a particular telephone set desired to be informed that a facsimile signal has been received from the particular distant facsimile apparatus are previously specified, and identification information associated respectively with the particular facsimile apparatus and the telephone set, for example, a facsimile subscriber's number and a telephone subscriber's number are stored in the memory unit.

If a facsimile signal is received from a distant terminal over the digital line and a subscriber's number transmitted from the distant terminal is detected, then this subscriber's number is compared with the facsimile subscriber's number stored in the memory unit.

If it is determined that both subscriber's numbers correspond to each other, the facsimile apparatus automatically originates a call on the basis of the telephone number of the destination terminal which is stored in the memory unit and sends, after the distant telephone set has answered the call, a voice message stating that a facsimile signal has been received from the aforesaid particular facsimile apparatus.

With the above described arrangement, an operator can become readily aware of the reception of a facsimile signal from a particular distant facsimile apparatus by means of a voice message at a location nearest to a specified telephone set without the need to move to a place where the facsimile apparatus is situated.

As is apparent from the foregoing, in the facsimile apparatus according to the present invention, if a facsimile signal is received from a specified facsimile terminal, a voice message stating that the facsimile signal has been received is automatically sent to a telephone set corresponding to a registered telephone subscriber's number. Accordingly, if an operator arbitrarily registers the subscriber's number of a distant facsimile apparatus expected to transmit a facsimile signal and the subscriber's number of a telephone set desired to be informed of the reception of a facsimile signal, the operator can become readily aware of the reception of a facsimile signal by means of the voice message at the nearest location without the need to move to a place where the facsimile apparatus is situated. It is therefore possible for the operator to immediately fetch a transmitted document.

The above and other objects, features and advantages of the present invention will be apparent from the following description of preferred embodiments of the invention with reference to the accompanying drawings.

BRIEF DESCRIPTION OF THE DRAWINGS

FIG. 3 is a view showing an example of a table of identification information and a destination telephone number, which table is stored in the memory unit of the embodiment shown in FIG. 1;

FIG. 4 is a view showing another example of a table of identification information and destination telephone numbers, which table is stored in the memory unit of the embodiment shown in FIG. 1;

FIG. 5 is a view showing yet another example of a table of identification information and destination telephone numbers, which table is stored in the memory unit of the embodiment shown in FIG. 1;

DESCRIPTION OF THE PREFERRED EMBODIMENTS

Preferred embodiments of the present invention will be described below, in detail, with reference to the accompanying drawings.

Figure 1:
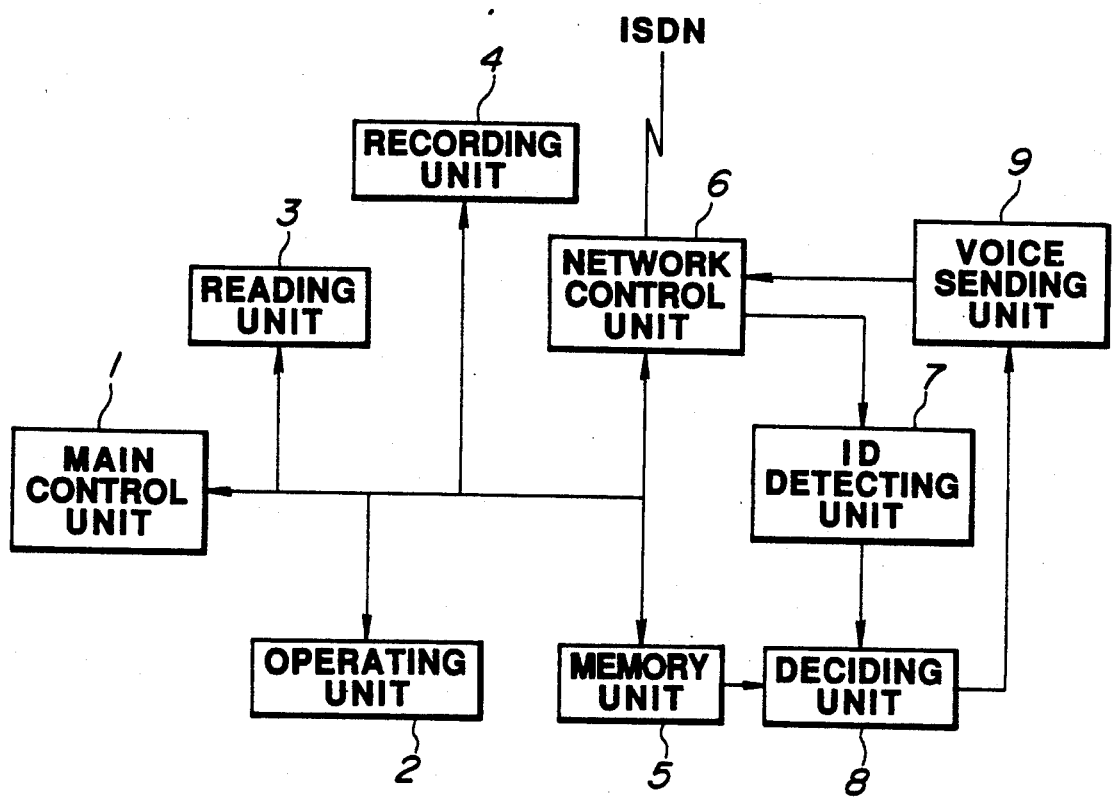
FIG. 1 is a block diagram showing a first embodiment of a facsimile apparatus according to the present invention.

FIG. 1 shows in block form a first embodiment of a facsimile apparatus according to the present invention. The illustrated facsimile apparatus is connected to an ISDN line and comprises the following major elements: a main control unit 1 for providing control over the entire operation of the facsimile apparatus; an operating unit 2 for executing various operations such as the operation required to enter or change a desired setting; a reading unit 3 for reading a document to be transmitted; a recording unit 4 for recording received data or data read by the reading unit 3; a memory unit 5 for storing facsimile subscriber's numbers (ID information) associated with particular facsimile apparatus as well as telephone subscriber's numbers (destination telephone number) of particular telephone sets, these numbers being entered through the operating unit 2; a network control unit 6 for controlling an interface of the ISDN line; an ID detection unit 7 for detecting, via the network control unit 6, an incoming subscriber's number which is sent from a distant terminal; a decision unit 8 for determining whether the incoming subscriber's number detected by the ID detection unit 7 corresponds to any one of the facsimile subscriber's numbers stored in the memory unit 5, by comparing the incoming subscriber's number with each of the stored facsimile subscriber's numbers; and a voice sending unit 9 arranged to automatically originate a call based on the telephone subscriber's number stored in the memory unit 5, if both subscriber's numbers correspond to each other, and then to send a voice message stating that a facsimile signal has been received.

The facsimile subscriber's numbers stored in the memory unit 5 of the facsimile apparatus correspond to particular distant facsimile apparatus from which incoming signals are expected. Such facsimile subscriber's numbers can be arbitrarily registered by means of the operating unit 2.

The telephone subscriber's number, which is stored in the memory unit 5 together with the aforesaid facsimile subscriber's numbers, corresponds to a telephone set which is to receive a facsimile signal from a particular facsimile apparatus whose facsimile subscriber's numbers have been registered. Such telephone subscriber's number can likewise be arbitrarily registered by means of the operating unit 2.

Figure 2:
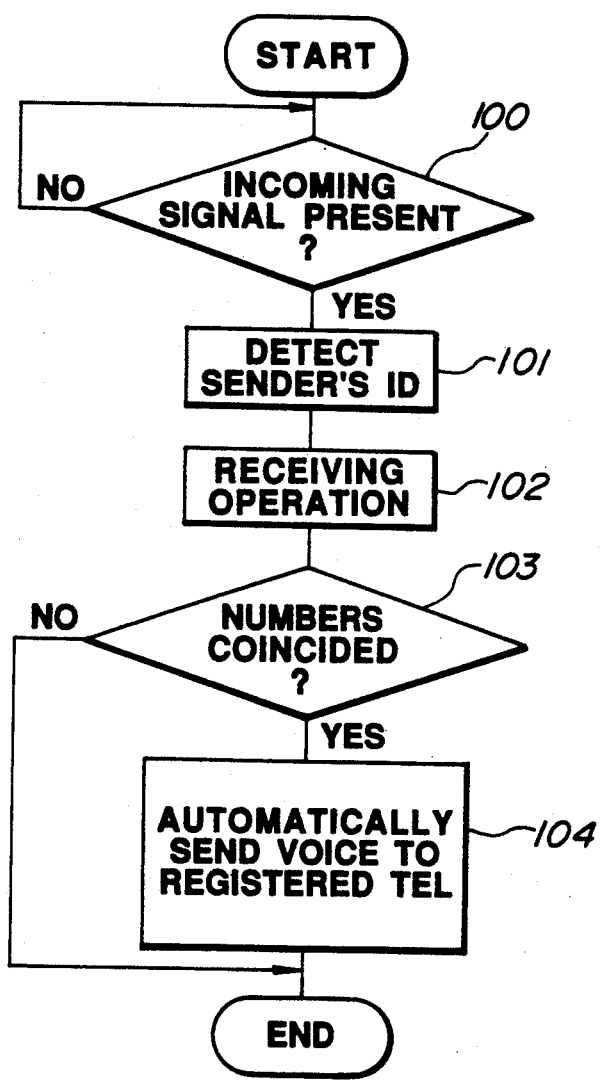
FIG. 2 is a flowchart showing an example of the receiving operation of the embodiment shown in FIG. 1.

The operation of the facsimile apparatus will now be described in detail with reference to the flowchart of FIG. 2.

First of all, the main control unit 1 determines whether an incoming facsimile signal is present, while monitoring the operation of the network control unit 6 (Step 100).

If it is determined in Step 100 that an incoming facsimile signal is present, the main control unit 1 instructs the ID detection unit 7 to detect an incoming subscriber's number which is received from a distant terminal over the ISDN line (Step 101).

Subsequently, the main control unit 1 proceeds to the receiving operation of causing the recording unit 4 to record the information received from the distant terminal and discharge the recorded information (Step 102).

After the completion of the above-described receiving operation, the main control unit 1 instructs the decision unit 8 to determine whether the incoming subscriber's number which has been detected by the ID detection unit 7 corresponds to any one of the facsimile subscriber's numbers stored in the memory unit 5 (Step 103).

In Step 103, if it is determined that both subscriber's numbers do not correspond to each other, the main control unit 1 immediately terminates all the operations.

If it is determined in Step 103 that both subscriber's numbers correspond to each other, then the main control unit 1 generates an instruction to activate the voice sending unit 9.

The voice sending unit 9 in turn automatically calls a destination telephone set over the ISDN line on the basis of the telephone subscriber's number which has been stored in the memory unit 5 together with the aforesaid facsimile subscriber's numbers.

The voice sending unit 9 waits for an answer from the called telephone set and, if the answer is acknowledged, the voice sending unit 9 sends out a voice message stating that a facsimile signal has been received (Step 104).

It will be appreciated from the foregoing that an operator at a receiving side can become aware that a facsimile signal has been received from a particular facsimile apparatus, by means of the voice message heard from a previously specified telephone set without the need to move to a place where the facsimile apparatus is installed. Accordingly, the operator can immediately fetch the received facsimile document.

FIG. 3 shows a table which indicates an example of the relationship between the ID information and destination telephone number stored in the memory unit 5. Registered in the table of FIG. 3, are a plurality of ID information (ID numbers) ID1, ID2, ..., indicative of different distant terminals, and a single destination telephone number TEL1. According to this example, if a facsimile signal is received from a distant terminal corresponding to any one of the registered ID numbers, a call is automatically originated on the basis of the destination telephone number TEL1 and a telephone set corresponding to the destination telephone number TEL1 is informed that the incoming facsimile signal has been transmitted from one of the registered distant terminals. In such a case, it is also preferable to specify the distant terminal from the ID number thereof and transmit a voice message stating that a facsimile signal has been received from Mr. X., in place of the aforementioned voice message stating that a facsimile signal has been received. Further, a facsimile apparatus may be designated as a destination terminal to thereby inform, by means of image information, that a facsimile signal has been received from any one of the registered distant terminals. In this case, the voice sending unit 9 shown in FIG. 1 may be replaced by an image sending unit which transmits image message information indicating that a facsimile signal has been received from Mr. X.

Although the destination telephone number TEL1 indicating one destination terminal is registered in the table of FIG. 3, a set of ID information on distant terminals may be, as shown in FIG. 4, divided into a plurality of groups and different destination telephone numbers may be registered for the respective groups. In this arrangement, for example, if a facsimile signal is received from a distant terminal having any one of ID numbers ID1, ID2, ... which are specified as a first group, a telephone set corresponding to the destination telephone number TEL1 is informed that the facsimile signal has been received. If a facsimile signal is received from a distant terminal having any one of ID numbers IDk, IDk+1, ... which are specified as a second group, a telephone set corresponding to a destination telephone number TEL2 is informed that the facsimile signal has been received.

Otherwise, the table shown in FIG. 5 may be registered in the memory unit 5. In this table, the destination telephone numbers TEL1, TEL2, ... are registered for the respective registered ID numbers ID1, ID2, ... According to this configuration, for example, if a facsimile signal is received from a distant terminal having the ID number ID1, a telephone set corresponding to the destination telephone number TEL1 is informed that the facsimile signal has been received. If a facsimile signal is received from a distant terminal having the ID number ID2, a telephone set corresponding to the destination telephone number TEL2 is informed that the facsimile signal has been received.

The above-described embodiment is arranged in such a manner that a comparison between the subscriber's number transmitted from a distant terminal and the facsimile subscriber's numbers stored in the memory unit 5 and the sending of a voice message based on the result of the comparison are performed after the completion of a receiving operation. However, an alternative arrangement may be utilized.

For example, it may be arranged in such a manner that a comparison between the subscriber's number transmitted from a distant terminal and the facsimile subscriber's numbers stored in the memory unit 5 is made immediately after the reception of a facsimile signal and if it is determined that both subscriber's numbers correspond to each other, a call is automatically originated during the reception of the facsimile signal to send a voice message by utilizing a non-busy B channel of the ISDN line (in this example, it is assumed that the ISDN line includes two B channels and one D channel).

Figure 6:
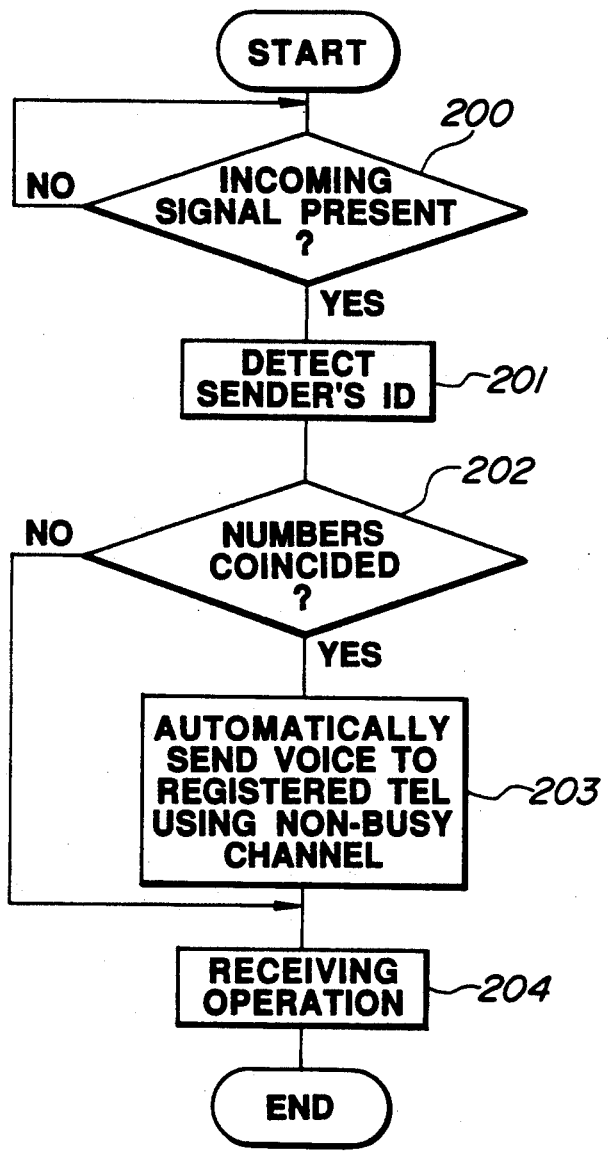
FIG. 6 is a flowchart showing another example of the receiving operation of the embodiment shown in FIG. 1.

The operation of the above-described arrangement will be described below with reference to the flowchart of FIG. 6.

First of all, the main control unit 1 determines whether an incoming facsimile signal is present, while monitoring the operation of the network control unit 6 (Step 200).

If it is determined in Step 200 that an incoming facsimile signal is present, the main control unit 1 instructs the ID detection unit 7 to detect an incoming subscriber's number which is received from a distant terminal over the ISDN line (Step 201).

Subsequently, the main control unit 1 instructs the decision unit 8 to determine whether the incoming subscriber's number which has been detected by the ID detection unit 7 corresponds to any one of the facsimile subscriber's numbers stored in the memory unit 5 (Step 202).

In Step 202, if it is determined that both subscriber's numbers do not correspond to each other, this indicates that the facsimile signal is transmitted from a terminal other than the registered distant terminals. The main control unit 1 in turn proceeds to the receiving operation of causing the recording unit 4 to record the information received from the distant terminal and discharge the recorded information (Step 204).

If it is determined in Step 202 that both subscriber's numbers correspond to each other, then the main control unit 1 generates an instruction to activate the voice sending unit 9.

The voice sending unit 9 in turn automatically originates a call for transmission over a non busy channel of the ISDN line on the basis of the telephone subscriber's number which has been stored in the memory unit 5 together with the aforesaid facsimile subscriber's numbers.

The voice sending unit 9 waits for an answer from a called telephone set and, if the answer is acknowledged, the voice sending unit 9 sends a voice message stating that, for example, a facsimile signal has been received (Step 203).

Simultaneously, the main control unit 1 proceeds to the receiving operation of causing the recording unit 4 to record the information received from the distant terminal and discharge the recorded information (Step 204).

With the above-described arrangement, an operator can immediately fetch a received facsimile document.

Figure 7:
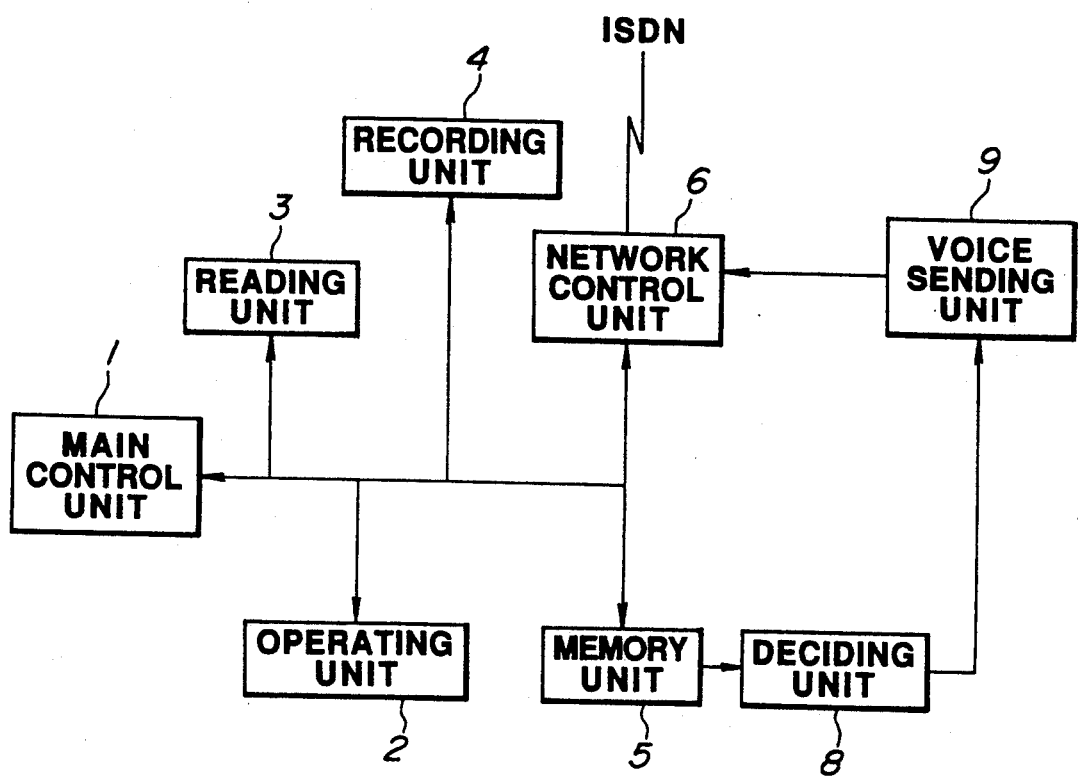
FIG. 7 is a block diagram showing a second embodiment of a facsimile apparatus according to the present invention.

FIG. 7 shows in block form a second embodiment of a facsimile apparatus according to the present invention. According to the embodiment shown in FIG. 7, the facsimile apparatus is arranged to inform a previously registered destination terminal that a facsimile signal has been received from a distant terminal, without identifying the ID number thereof which is transmitted over the ISDN line. In this embodiment, only destination telephone numbers are stored in the memory unit 5.

Figure 8:
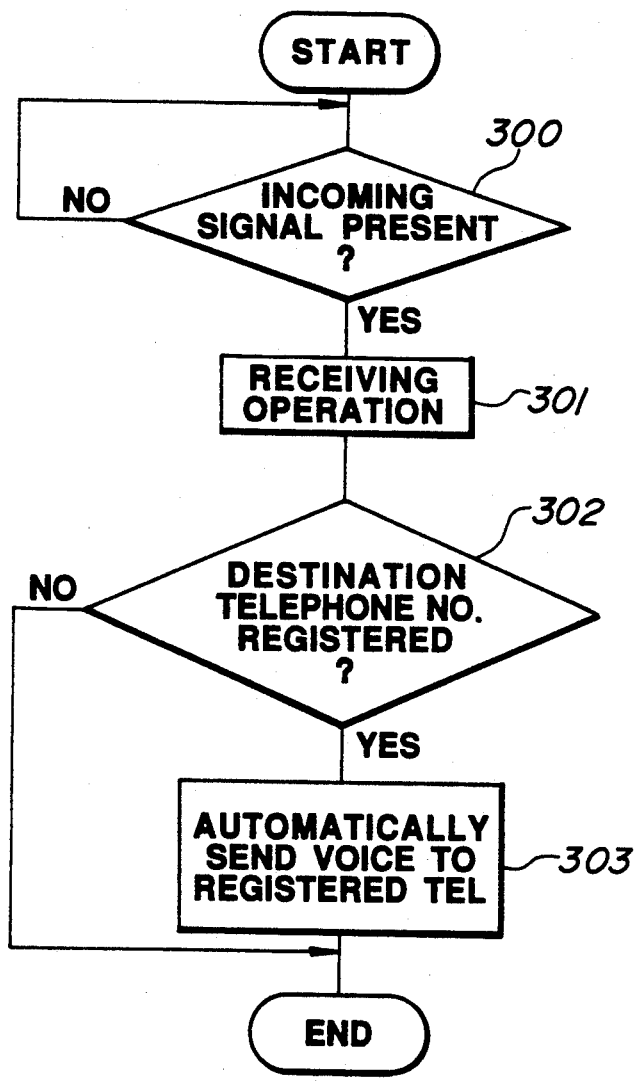
FIG. 8 is a flowchart showing an example of the receiving operation of the embodiment shown in FIG. 7.

The operation of the facsimile apparatus will now be described in detail with reference to the flowchart of FIG. 8.

First of all, the main control unit 1 determines whether an incoming facsimile signal is present, while monitoring the operation of the network control unit 6 (Step 300).

If it is determined in Step 300 that an incoming facsimile signal is present, the main control unit 1 proceeds to the receiving operation of causing the recording unit 4 to record the information received from the distant terminal and discharge the recorded information (Step 302).

After the completion of the above-described receiving operation, the main control unit 1 instructs the decision unit 8 to determine whether a corresponding destination telephone number is stored in the memory unit 5 (Step 303).

In Step 303, if it is determined that no corresponding destination telephone number is stored, the main control unit 1 immediately terminates all the operations.

If it is determined in Step 303 that the corresponding destination telephone number is stored, then the main control unit 1 generates an instruction to activate the voice sending unit 9.

The voice sending unit 9 in turn automatically calls a destination telephone set over the ISDN line on the basis of the telephone subscriber's number which has been stored in the memory unit 5.

The voice sending unit 9 waits for an answer from the called telephone set and, if the answer is acknowledged, the voice sending unit 9 sends a voice message stating that, for example, a facsimile signal has been received (Step 304).

It will be appreciated from the foregoing that an operator at a receiving side can become aware that an information signal has been received from a facsimile apparatus, without the need to move to a place where the facsimile apparatus of the receiving side is located. Accordingly, the operator can immediately fetch the received facsimile document.

Figure 9:
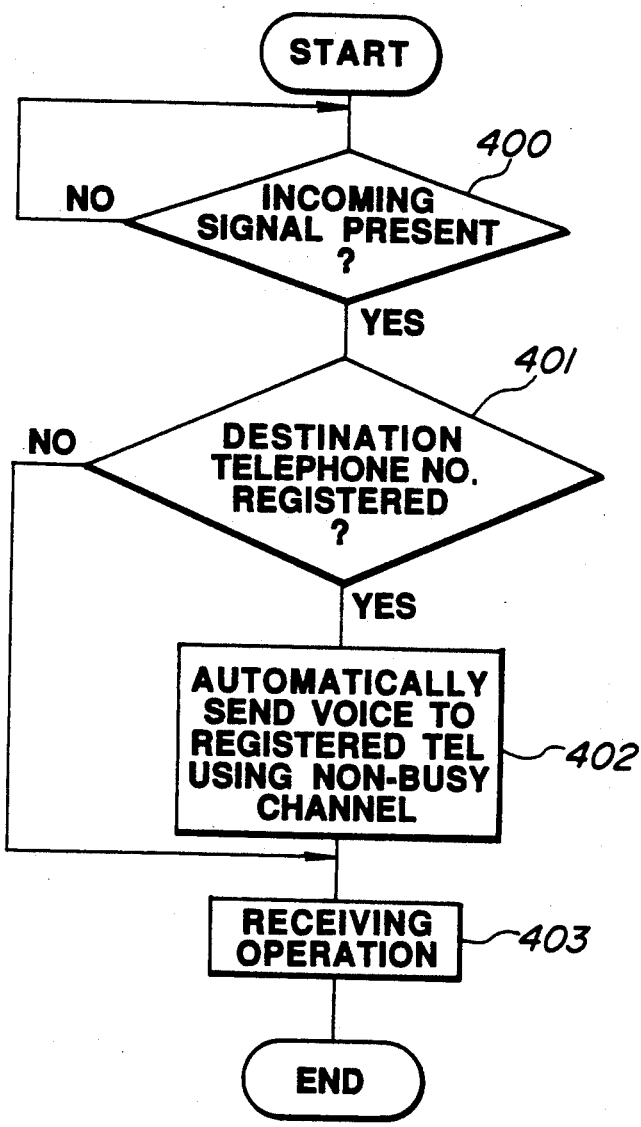
FIG. 9 is a flowchart showing another example of the receiving operation of the embodiment shown in FIG. 7.

FIG. 9 is a flowchart showing the operation of an arrangement in which a call is automatically originated during the reception of a facsimile signal to send a voice message by utilizing a non-busy B channel of the ISDN line (in this arrangement, it is assumed that the ISDN line includes two B channels and one D channel).

Referring to the flowchart of FIG. 9, the main control unit 1 determines whether an incoming facsimile signal is present, while monitoring the operation of the network control unit 6 (Step 400).

If it is determined in Step 400 that an incoming facsimile signal is present, the main control unit 1 instructs the decision unit 8 to determine whether a corresponding destination telephone number is stored in the memory unit 5 (Step 401).

In Step 401, if it is determined that no corresponding destination telephone number is stored, the main control unit 1 proceeds to the receiving operation of causing the recording unit 4 to record the information received from the distant terminal and discharge the recorded information (Step 403).

If it is determined in Step 401 that the corresponding destination telephone number is stored, then the main control unit 1 generates an instruction to activate the voice sending unit 9.

The voice sending unit 9 in turn automatically calls a destination telephone set over a non-busy channel of the ISDN line on the basis of the telephone subscriber's number which has been stored in the memory unit 5.

The voice sending unit 9 waits for an answer from the called telephone set and, if the answer is acknowledged, the voice sending unit 9 sends a voice message stating that, for example, a facsimile signal has been received (Step 402).

Simultaneously, the main control unit 1 proceeds to the receiving operation of causing the recording unit 4 to record the information received from the distant terminal and discharge the recorded information (Step 403).

With the above-described arrangement, an operator can fetch the received facsimile document in no time.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A facsimile apparatus comprising:

network control means connected to a digital line wherein said digital line is an ISDN line having at least two channels;

incoming signal detecting means for detecting an incoming facsimile signal when said facsimile signal is issued to said network control means over said digital line;

identification information detecting means for detecting incoming identification information of a caller facsimile apparatus, said incoming identification information being informed over said digital line when said facsimile signal is received;

memory means for storing identification information of at least one caller facsimile apparatus to communicate with and at least one telephone number of at least one destination terminal associated with said stored identification information;

judging means for comparing said incoming identification information detected by said identification information detecting means with said identification information stored in said memory means and for judging whether or not said incoming identification information corresponds to said stored identification information of at least one caller facsimile apparatus; and voice sending means, when said judging means judges that said incoming identification information corresponds to identification information stored in said memory means, for automatically calling, by controlling said network control means, the destination terminal on the basis of said telephone number associated with said stored identification information and for sending to said destination terminal a voice message stating that the facsimile signal has been received, wherein said network control means automatically calls said destination terminal through a first channel of said ISDN line, which is different from a second channel through which said facsimile signal is received.

2. A facsimile apparatus according to claim 1, wherein said memory means stores identification information of a plurality of facsimile apparatus to communicate with and one telephone number of one destination terminal associated with said stored identification information of said plurality of facsimile apparatus.

3. A facsimile apparatus according to claim 1, wherein said memory means stores identification information of a plurality of facsimile apparatus divided into a plurality of groups and a plurality of telephone numbers of a plurality of destination terminals each correspondingly associated with each of said plurality of groups.

4. A facsimile apparatus according to claim 1, wherein said memory means stores identification information of a plurality of facsimile apparatus to communicate with and a plurality of telephone numbers of a plurality of destination terminals each correspondingly associated with each of said identification information of said plurality of facsimile apparatus.

5. A facsimile apparatus according to claim 1, wherein said voice sending means automatically calls said destination terminal by controlling said network control means after completion of a facsimile receiving operation for answering to said incoming facsimile signal.

6. A facsimile apparatus according to claim 1, wherein said voice sending means automatically calls said destination terminal by controlling said network control means in response to said incoming facsimile signal through said first channel of said ISDN line, which is different from said second channel through which said facsimile signal is received.

7. A facsimile apparatus comprising:
   network control means connected to a digital line wherein said digital line is an ISDN line having at least two channels;
   incoming signal detecting means for detecting an incoming facsimile signal when said facsimile signal is issued to said network control means over said digital line;
   memory means for registering a telephone number of a destination terminal to which receipt of said facsimile signal is to be informed;
   judging means, when said facsimile signal is detected by said incoming signal detecting means, for judging whether or not said telephone number of said destination terminal is registered in said memory means; and
   voice sending means, when said judging means judges that said telephone number is registered in said memory means, for automatically calling by controlling said network control means the destination terminal on the basis of said telephone number registered in said memory means and for sending to said destination terminal a voice message stating that the facsimile signal has been received, wherein said network control means automatically calls said destination terminal through a first channel of said ISDN line, which is different from a second channel through which said facsimile signal is received.

8. A facsimile apparatus according to claim 7, wherein said voice sending means automatically calls said destination terminal by controlling said network control means after completion of a facsimile receiving operation for answering to said facsimile signal.

9. A facsimile apparatus according to claim 7, wherein said voice sending means automatically calls said destination terminal by controlling said network control means in response to said facsimile signal through said first channel of said ISDN line, which is different from said second channel through which said facsimile signal is received.

10. A facsimile apparatus comprising:
   network control means connected to an ISDN line having at least two channels;
   incoming signal detecting means for detecting an incoming facsimile signal when said facsimile signal is issued to said network control means over said ISDN line;
   identification information detecting means for detecting incoming identification information of a caller facsimile apparatus, said incoming identification information being informed over said ISDN line when said facsimile signal is received;
   memory means for storing identification information of at least one caller facsimile apparatus to communicate with and at least one telephone number of at least one destination terminal associated with said stored identification information;
   judging means for comparing said incoming identification information detected by said identification information detecting means with said stored identification information stored in said memory means and for judging whether or not aid incoming identification information corresponds to said stored identification information of at least one caller facsimile apparatus; and
   voice sending means, when said judging means judges that said incoming identification information corresponds to identification information stored in said memory means, for automatically calling, by controlling said network control means, the destination terminal through a first channel of said ISDN line which is different from a second channel through which said facsimile signal is received on the basis of said telephone number associated with said stored identification information and for sending to said destination terminal a voice message stating that the facsimile signal has been received.

* * * * *

UNITED STATES PATENT AND TRADEMARK OFFICE
CERTIFICATE OF CORRECTION

PATENT NO. : 5,210,621
DATED : May 11, 1993
INVENTOR(S) : Haruki Kinoshita

It is certified that error appears in the above-indentified patent and that said Letters Patent is hereby corrected as shown below:

Claim 10, column 10, line 36, change "aid" to --said--.

Signed and Sealed this

Twelfth Day of April, 1994

Attest:

BRUCE LEHMAN

*Attesting Officer*

*Commissioner of Patents and Trademarks*